US008893082B2

(12) United States Patent
Naden et al.

(10) Patent No.: US 8,893,082 B2
(45) Date of Patent: Nov. 18, 2014

(54) TYPE INFERENCE OF GENERIC TYPE PARAMETERS IN OVERLOADED FUNCTIONS USING TYPE INTERVALS AND INFERENCE DIRECTIONS

(75) Inventors: Karl B. Naden, Pittsburgh, PA (US); David R. Chase, Belmont, MA (US); Justin R. Hilburn, Eugene, OR (US)

(73) Assignee: Oracle International Corporation, Redwood Shores, CA (US)

( * ) Notice: Subject to any disclaimer, the term of this patent is extended or adjusted under 35 U.S.C. 154(b) by 266 days.

(21) Appl. No.: 13/601,766

(22) Filed: Aug. 31, 2012

(65) Prior Publication Data

US 2014/0068574 A1    Mar. 6, 2014

(51) Int. Cl.
*G06F 9/44* (2006.01)
*G06F 9/45* (2006.01)

(52) U.S. Cl.
CPC ............... *G06F 9/4428* (2013.01); *G06F 8/31* (2013.01); *G06F 9/443* (2013.01); *G06F 8/437* (2013.01)
USPC ............ 717/114; 717/165; 717/143; 717/106

(58) Field of Classification Search
CPC ........... G06F 8/31; G06F 8/437; G06F 8/423; G06F 8/433; G06F 9/443; G06F 9/4431; G06F 9/4428
USPC .................................................. 717/114–117
See application file for complete search history.

(56) References Cited

U.S. PATENT DOCUMENTS

| | | | | |
|---|---|---|---|---|
| 5,696,974 | A * | 12/1997 | Agrawal et al. | 717/152 |
| 8,627,282 | B1 * | 1/2014 | Karr | 717/114 |
| 2002/0133806 | A1 * | 9/2002 | Flanagan et al. | 717/123 |
| 2004/0194058 | A1 * | 9/2004 | Meijer et al. | 717/116 |
| 2006/0048095 | A1 * | 3/2006 | Meijer et al. | 717/114 |
| 2007/0256060 | A1 * | 11/2007 | Ryu et al. | 717/140 |
| 2008/0262992 | A1 * | 10/2008 | Meijer et al. | 706/52 |
| 2009/0234804 | A1 * | 9/2009 | Whitechapel et al. | 707/3 |
| 2013/0332912 | A1 * | 12/2013 | Makino et al. | 717/137 |

OTHER PUBLICATIONS

Kuijper et al., Generic Programming of Reusable, High Performance Container Types using Automatic Type Hierarchy Inference and Bidirectional Antichain Typing, Feb. 16, 2011.*

* cited by examiner

*Primary Examiner* — Lewis A Bullock, Jr.
*Assistant Examiner* — Tina Huynh
(74) *Attorney, Agent, or Firm* — Park, Vaughan, Fleming & Dowler LLP; Chia-Hsin Suen

(57) ABSTRACT

The disclosed embodiments provide a system that facilitates the development and execution of a software program. During operation, the system obtains a type interval for a generic type parameter of an implementation of an overloaded function. Next, the system selects an inference direction for the generic type parameter based on a variance of the generic type parameter, wherein the inference direction is an upward inference direction or a downward inference direction. Finally, the system uses the type interval and the inference direction to perform type inference on the generic type parameter.

14 Claims, 6 Drawing Sheets

TYPE INFERENCE OF GENERIC TYPE PARAMETERS IN OVERLOADED FUNCTIONS USING TYPE INTERVALS AND INFERENCE DIRECTIONS

RELATED APPLICATION

The subject matter of this application is related to the subject matter in a co-pending non-provisional application by inventors David Chase, Guy Steele, Karl Naden, Justin Hilburn and Victor Luchangco, entitled "Fast Dispatch Predicate for Overloaded Functions with Generic Type Hierarchies that Lack Contravariance," having Ser. No. 13/601,730, and filing date Aug. 31, 2012.

The subject matter of this application is related to the subject matter in a co-pending non-provisional application by inventors Karl Naden, Justin Hilburn, David Chase, Guy Steele, Victor Luchangco and Eric Allen, entitled "Dispatch Predicate for Overloaded Functions using Type Intervals," having Ser. No. 13/601,745, and filing date Aug. 31, 2012.

BACKGROUND

1. Field

The disclosed embodiments relate to function overloading in programming languages. More specifically, the disclosed embodiments relate to techniques for performing type inference of generic type parameters in overloaded functions using type intervals and inference directions for the generic type parameters.

2. Related Art

Programming languages may support function and/or method overloading, in which multiple methods within an object and/or functions declared within the same scope share the same name. Such name sharing may facilitate the identification and/or grouping of functions and/or methods that perform conceptually similar tasks but operate on different types and/or amounts of data.

During invocation of an overloaded function and/or method, a programming language may dispatch a function call to the function and/or method by selecting an implementation of the function and/or method based on the types and/or number of arguments from the function call. For example, the programming language may select the most specific implementation from a set of candidate implementations of the function and/or method that are accessible and applicable. Moreover, the programming language may use multiple dispatch, which resolves the function call based on the runtime types of the function call's arguments.

However, an overloaded function and/or method may include one or more generic functions containing parameterized types. Because the generic functions may accept parameters from the same and/or overlapping sets of types, the generic functions may complicate the determination of specificity and/or applicability during dispatch of a function call to the function and/or method. The function call may also include generic type parameters, which must also be inferred for correct dispatching of the function call. In turn, the additional complexity and/or computation associated with generic functions and/or generic type parameters in overloaded functions may increase the overhead associated with runtime dispatch of function calls to the overloaded functions.

Hence, what is needed is a mechanism for performing multiple dispatch of function calls associated with generic type hierarchies and/or type inference on generic type parameters associated with the function calls.

SUMMARY

The disclosed embodiments provide a system that facilitates the development and execution of a software program. During operation, the system obtains a type interval for a generic type parameter of an implementation of an overloaded function. Next, the system selects an inference direction for the generic type parameter based on a variance of the generic type parameter, wherein the inference direction is an upward inference direction or a downward inference direction. Finally, the system uses the type interval and the inference direction to perform type inference on the generic type parameter.

In some embodiments, the system also selects the inference direction based on an annotation associated with the generic type parameter.

In some embodiments, using the type interval and the inference direction to perform type inference on the generic type parameter involves propagating one or more limits associated with the type interval through a set of constraints associated with the generic type parameter based on the inference direction.

In some embodiments, propagating the one or more limits through the constraints based on the inference direction involves:

(i) performing a first propagation of the one or more limits to update one or more upper limits in the type interval and one or more lower limits in type intervals of one or more generic type parameters related to the generic type parameter; and (ii) when the inference direction is the upward inference direction, performing a second propagation of the one or more limits to further update the one or more upper limits.

In some embodiments, propagating the one or more limits through the constraints based on the inference direction further involves:

(i) when the generic type parameter comprises one or more self-typed constraints, adjusting a lower limit of the type interval upward to a lowest self-type that simultaneously satisfies the one or more self-typed constraints and remains below the one or more upper limits; and (ii) when the inference direction is the upward inference direction, adjusting the one or more upper limits downward to a highest self-type that simultaneously satisfies the one or more self-typed constraints and remains above the lower limit.

In some embodiments, using the type interval and the inference direction to perform type inference on the generic type parameter further involves:

(i) when the type interval is non-empty after the one or more limits are propagated through the constraints, choosing a binding for the generic type parameter based on the inference direction; and (ii) when the type interval is empty after the one or more limits are propagated through the constraints, determining that the implementation is not applicable to a function call associated with the overloaded function and the type interval.

In some embodiments, choosing the binding for the generic type parameter based on the inference direction involves at least one of selecting the binding as the meet of all limits associated with the upward inference direction in the type interval, and selecting the binding as the join of all limits associated with the downward inference direction in the type interval.

In some embodiments, selecting the inference direction based on the variance of the generic type parameter involves selecting the downward inference direction for the generic type parameter when the variance is covariant or invariant, and selecting the upward inference direction for the generic type parameter when the variance is contravariant.

BRIEF DESCRIPTION OF THE FIGURES

In the figures, like reference numerals refer to the same figure elements.

DETAILED DESCRIPTION

Figure 1:
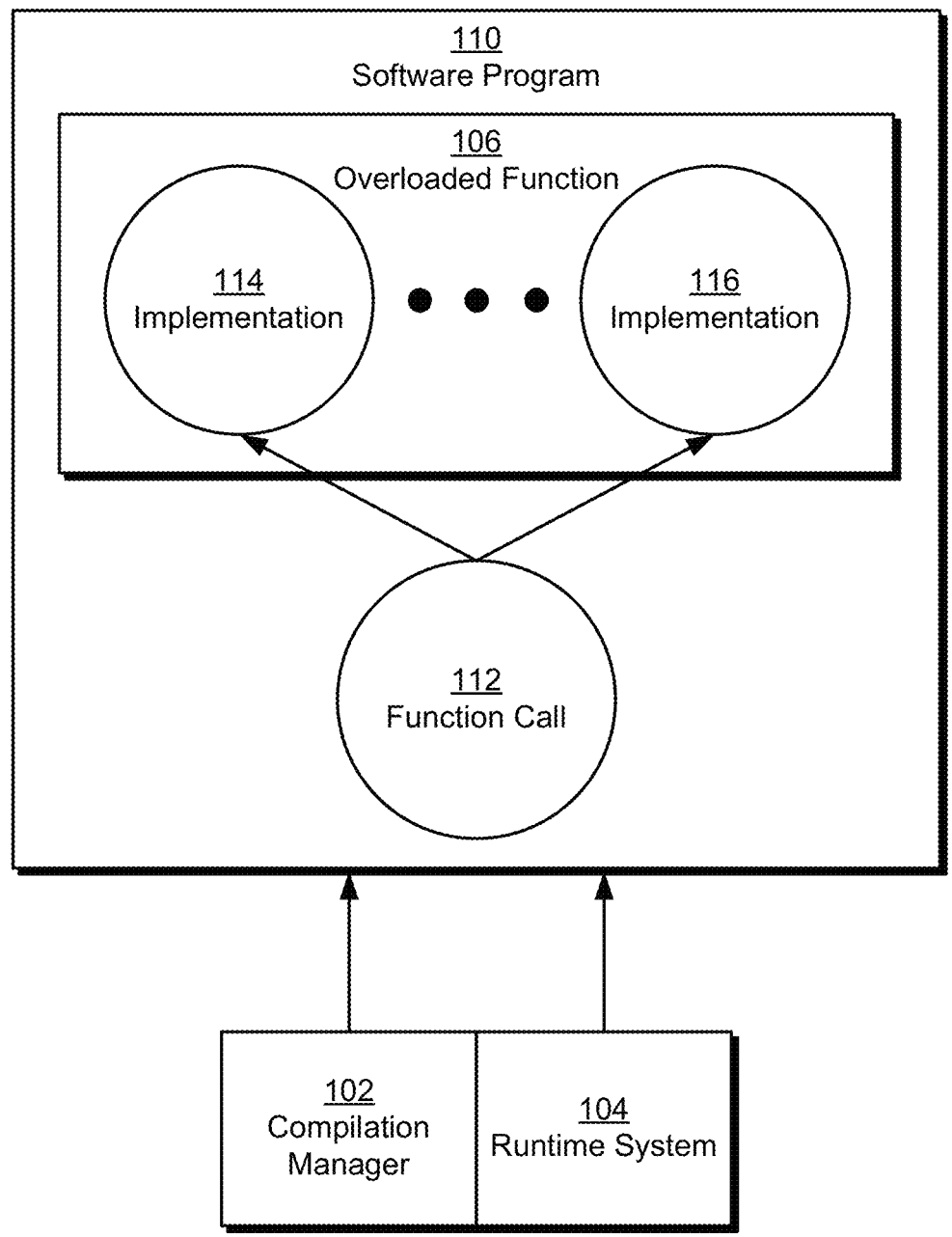
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the development and execution of a software program. During development of the software program, source code for the software program may be created using a programming language. The source code may then be compiled into an executable form to enable the execution of the software program.

More specifically, the disclosed embodiments provide a method and system for facilitating the development and execution of a software program in a programming language with a flexible system of generic trait and class object types, generic functions and methods, overloaded functions and methods, type inference, and static type checking. To support such features, the programming language may provide a well-defined and efficient implementation of overloaded dispatch and type inference.

First, the programming language may perform runtime dispatch of function calls associated with generic type hierarchies. During runtime of the software program, a function call to an overloaded function may be resolved based on a partial order of implementations of the overloaded function and the applicability of one or more of the implementations to the function call. For example, the partial order may correspond to a most-to-least specific order, such that the implementation selected for invocation by the function call is the most specific implementation that is applicable and accessible to the function call.

Second, the programming language may perform type inference on generic type parameters of the implementation during dispatch of the function call. During type inference, the programming language may obtain a type interval for a generic type parameter of the selected invocation. The programming language may also select an inference direction for the generic type parameter based on a variance of the generic type parameter. For example, the programming language may use a heuristic that selects a downward inference direction for the generic type parameter if the variance is covariant or invariant and an upward inference direction for the generic type parameter if the variance is contravariant.

After the inference direction is selected, the programming language may perform type inference on the generic type parameter by propagating one or more limits associated with the type interval through a set of constraints associated with the generic type parameter based on the inference direction. For example, the programming language may perform a first propagation of the limit(s) to update one or more upper limits in the type interval and one or more lower limits in type intervals of one or more generic type parameters related to the generic type parameter. The programming language may also perform a second propagation of the one or more limits to further update the one or more upper limits if the inference direction is the upward inference direction.

The programming language may further adjust limits based on self-typed constraints associated with the generic type parameter. For example, the programming language may adjust a lower limit of the type interval upward to a lowest self-type that simultaneously satisfies the one or more self-typed constraints and remains below the one or more upper limits. The programming language may also adjust the one or more upper limits downward to a highest self-type that simultaneously satisfies the one or more self-typed constraints and remains above the lower limit if the inference direction is the upward inference direction.

FIG. 1 shows a schematic of a system in accordance with the disclosed embodiments. The system includes a compilation manager 102 and runtime system 104 that may be used to manage the development and execution of a software program 110. Software program 110 may correspond to a standalone application, operating system, enterprise application, database, library, device driver, and/or other type of software. In addition, software program 110 may be executed in a variety of environments. For example, software program 110 may be executed on a single desktop computer or workstation, or software program 110 may be distributed across multiple servers within a data center. Along the same lines, software program 110 may be executed sequentially or in parallel on one or more processors and/or processor cores.

In one or more embodiments, compilation manager 102 and runtime system 104 are associated with a programming language with a flexible system of generic trait and class object types, generic functions and methods, overloaded functions and methods, type inference, and static type checking. For example, compilation manager 102 and runtime system 104 may enable the development, compilation, and/or execution of code for software program 110 written in the Fortress programming language. While the discussion below relates to the Fortress programming language, those skilled in the art will appreciate that the operation of compilation manager 102 and runtime system 104 may be used with other programming languages with similar type hierarchies and/or features.

The Fortress language type system includes objects, traits, tuples, arrows, and "Any." Traits and objects form one hierarchy, tuples form another, and arrows form a third; these three hierarchies are disjoint. Fortress types are partially ordered by a subtype relation, also expressed with the verb "extends" which appears in trait and object declarations, and the symbol "<:" which appears in semantics and algorithms. Type X is a subtype of Y ("X extends Y", "X<:Y") if every value that is an X is also a Y. Trait and object subtyping is declared (nominal); tuple and arrow subtyping is structural. Subtyping is reflexive, transitive, and antisymmetric: X<:X, X<:Y Y<:Z=>X<:Z, and X<:Y Y<:X=>X=Y.

The trait and object hierarchy is rooted at the trait "Object," which extends "Any." Within the trait and object hierarchy, objects and traits both may extend traits, but nothing may extend an object type. Trait extension is part of an object or trait's declaration:

trait Shape extends Object
trait Polygon extends Shape
trait Rectangle extends Polygon
trait RegularPoly extends Polygon
trait Square extends {Rectangle, RegularPoly}
object Cartesian (x:RR, y:RR) extends Point
object Polar (theta:RR, d:RR) extends Point A trait declaration may use a "comprises" clause to limit the traits and objects that can directly extend it:

trait Point comprises {Cartesian, Polar}
trait Quadrilateral comprises {Trapezoid, Kite, Irregular, Concave}
trait Kite extends Quadrilateral
trait Trapezoid extends Quadrilateral
trait Parallelogram extends Trapezoid comprises {Rectangle, Rhombus, Rhomboid}
trait Rectangle extends Parallelogram comprises {Oblong, Square}
trait Rhombus comprises {Square, NotSquare} extends {Parallelogram, Kite}
trait Square extends {Rectangle, Rhombus}

Comprised traits may be further extended (Trapezoid, Parallelogram, Rhombus); are not necessarily disjoint (Rhombus extends both Kite and Parallelogram, which in turn extends Trapezoid); and may inherit from other traits (Rhombus comprises Square, Square also extends Rectangle).

Tuple types are sequences of zero, two, or more (but not one) other types, including tuples, arrows, traits, and objects. All tuple types extend "Any," and a tuple type with $X=(X_1, X_2, \ldots X_N)$ extends $Y=(Y_1, Y_2, \ldots Y_M)$ if and only if N=M and $X_i<:Y_i$ for $1 \leq i \leq N$. That is, equal-length tuples are covariant in the types of their elements. The zero-length tuple is also known as "void" with "void type."

Arrow types are the types of functions. The arrow type D→R combines a domain type D and a range (return) type R. Arrow types are covariant in their range and contravariant in their domain type. For example, D1→R1<:D2→R2 if and only if R1<:R2 (note the order 1, 2, therefore covariant) and D2<:D1 (note the order 2, 1, therefore contravariant).

By construction, Fortress types may be divided into various disjoint sets—arrows are never tuples or traits, and traits are never tuples. Because object types cannot be further extended, any object type is known to exclude any trait that it is not declared to (transitively) extend, as well as all other object types. Fortress also allows an explicit declaration of exclusion on trait types; if T excludes U, then no type may extend both T and U. Declared exclusions extend naturally into tuple and arrow types; if R excludes S, then D→R excludes E→S, and if $S_k$ excludes $T_k$, then $(S_1, \ldots, S_k, S_n)$ excludes $(T_1, \ldots, T_k, \ldots, T_n)$.

Fortress also has generic trait and object types (pedantically speaking, first-order type operators) that combine types to form new types. Generic type declarations may include subtype constraints in their parameters:

trait Vector [\T extends Number\]
trait SortedList [\T extends Comparable [\T\] \]
trait Option [\T extends Any\]

Generic traits may also have a declared variance in their various parameters. Immutable data types like list and option can be covariant, and arrow-like types can be contravariant in their domain:

trait SortedList [\covariant T extends Comparable [\T\] \]
trait Option [\covariant T extends Any\] trait ArrowLike [\contravariant D, covariant R, covariant E\]

Unless otherwise specified, two instances of a generic trait are disjoint if they differ in any one of their static parameters. For example, although Integer<:Number, Matrix[Integer] is not a subtype of Matrix[Number]. Such generic types are invariant (or, more precisely, invariant with respect to each of their static parameters).

Every constructed type has a name of the form Stem [T1, T2, . . . , Tn], where Stem is an identifier and T1, T2, Tn is a (possibly empty) sequence of types. If the sequence of types is empty (that is, n=0), then Stem[ ] may be abbreviated as simply Stem. Strictly speaking, however, the stem is the name of a generic type, that is, a type that has parameters. When specific type arguments a1, a2, . . . , an are provided, then Stem[a1, a2, . . . , an] is said to be a type that is an instance of the generic type named by the Stem. For example, List[T] is a generic type, whose values are lists whose elements are all of type T. The identifier "List" is the stem of this generic type. The generic type has one type parameter. List [String] is a specific instance of this generic type, namely the type whose values are lists whose elements are all of type String. (The type String, in turn, is understood to mean String[ ], the unique instance of the generic type having zero type parameters and whose stem is "String.")

A particular idiom used in Fortress is the "self-typed generic," where a generic in T also comprises exactly T. This usually corresponds to a property of a binary operator method such as "Comparable" or "AssociativePlus":

```
trait Comparable[\T\] comprises T
    opr < (self, other:T)
end
trait AssociativePlus[\T\] comprises T
    opr + (self, other:T)
end
```

Because the only subtype of Comparable [\T\] is T, the two types include exactly the same sets of values, and are in some sense the same type.

Type inference applied to Fortress software programs may yield types that cannot be directly expressed in the source code. Analysis, optimization, and implementation are all easier to reason about when the types form a lattice, not just a partial order, and there are cases where the lattice properties are also obvious to the programmer, and may even reflect intent. This requires union and intersection types to ensure that join and meet operations are defined, plus a "bottom" type. Because no values actually have bottom type, the appearance of a bottom type indicates code that is surely "dead." When two types exclude each other, their meet is bottom.

At join points in a program (either flow join points or inference join points), "union" types may appear. In the presence of contravariant generic types, "intersection" types may appear. In this example, z's static type is X Y:

x:X= . . .
y:Y= . . .
z=if is Raining( ) then x else y end

In this example, a call to a generic function f results in static inference T=X Y:

f[\T\] (a:T, b:T)= . . .
x:X= . . .
y:Y= . . .
f (x,y)

When contravariant types are joined, intersection types can result. Here, the statically inferred type for T is X∩Y, because X∩Y→( ) is a supertype of both X→( ) and Y→( ):

f [\T\] (g:T→( ), h:T→( ))= . . .
x:X→( )= . . .
y:Y→( )= . . .
f (x,y)

Typecase statements are another source of intersection types. In each guarded clause of a typecase statement, the type of the tested expression is known to be both its static type (outside the guard) and its guard type; that is, the intersection of those two types. In this example, the type of t is known to be X∩Y:

```
x:X = . . .
typecase x of
    t:Y => . . . t . . .
end
```

Given a covariant generic G, G[\A\] G[\B\]<:G[\A B\]. Equality does not hold. Consider a set S={"cat", 11}; S is a Set[\String Number\] but is not a Set[\String\] Set[\Number\]. For intersections of covariant generics, given restrictions on types listed below, equality does hold: G[\A\]∩G[\B\]= G[\A∩B\].

Restrictions on Fortress types include the following:
No cycles in extends relationship.
Covariant and contravariant use restriction, including supertypes. Contravariant type parameters may only appear in contravariant context and covariant type parameters may only appear in covariant context.
Minimal instance of generic ancestors: If S<:G[\T$^{\rightarrow}$\], then there exists U$^{\rightarrow}$ such that for all T$^{\rightarrow}$ where S<:G[\T$^{\rightarrow}$\]:
  if G's ith static parameter is invariant, then $U_i=T_i$.
  if G's ith static parameter is covariant, then $U_i<:T_i$.
  if G's ith static parameter is contravariant, then $T_i<:U_i$.
  G[\U$^{\rightarrow}$\] is the minimal instance of G that S extends.
Generic of bottom is bottom: G[\∞\]=∞.
Finite depth: Foo[\T\] extends T is prohibited.
Finite depth: T<:G[\ . . . \] and T<:H[\ . . . \]. If G[\A\]<:H [\B\] exists then H[\C\]<:G[\D\] does not exist.
Allowed type constraints:
  T1<:T2 (T1 extends T2).
  T1<:K (T1 extends type constant expression K).
  T1<:G[\T2, T3\] (T1 extends some instantiated generic type whose instantiation contains type parameters).
  Acyclic type constraints: for a set of type constraints on a generic type or function, there is an order such that each static parameter only appears on the right-hand-side of constraints following its mention on the left-hand-side of a constraint. By default, the restriction that constraints are written in such an order is imposed. For example, [T1, T2<:T1, T3<:Pair[T1, T2]] is permitted because no type is used on the right-hand-side of a constraint until after the constraint where it appears on the left. Self-typed constraints are an exception to this rule; it is permitted to declare that T1<:SomeSelfType[T1]. Because of the different subtyping structure of self-types, this is really more of an equality constraint than an inequality constraint.
  Self-types meet: if T<:U=S[\U\] and T<:V=S[\V\] then T<:S[\meet(U, V)\] and meet(U, V) must be a declared (not intersection) type. In practice, this means that the instantiations of a particular self-typed generic must form a forest.

Fortress also has overloaded functions. Whenever more than one function with the same name appears in a scope, an overloaded function results, and the same-named functions become implementations that are chosen when the overloaded function is invoked. Overloaded functions may also be exported, either as explicitly overloaded functions (the multiple implementations appear in an API) or as the most general member of a set of implementations. When an overloaded function is called at runtime, the most specific of the set of implementations is chosen, considering all arguments to the function. The implementations to an overloaded function in a given scope must satisfy two rules to guarantee non-ambiguity and type safety.

First, the meet rule ensures that dispatch is unambiguous. Given two implementations f1 and f2 of the overloaded function f, either the domain of f1 excludes the domain of f2, or else f contains an implementation f3 whose domain is the meet of f1 and f2's domains (f3 may be f1, f2, or some other implementation). Second, the subtype rule ensures type safety; if f1's domain is a subtype of f2's domain, then f1's range must be a subtype of f2's range.

Fortress also supports generic type parameters in overloaded functions. Because generic type schema are not ordinary types, meet and subtype must be extended to cover this case. Dynamic subtype tests used to choose between ordinary types must also be extended to handle dispatch in the presence of generics.

As shown in FIG. 1, software program 110 may include an overloaded function 106, method, and/or subroutine that is invoked by a function call 112. Overloaded function 106 may include a set of implementations 114-116 in the same scope that share the same name but contain different types and/or numbers of parameters. During runtime of software program 110, compilation manager 102 and/or runtime system 104 may dispatch function call 112 by selecting an implementation from implementations 114-116 for invocation by function call 112.

To accommodate features of the programming language associated with software program 110, compilation manager 102 and/or runtime system 104 may provide a dispatch predicate for overloaded function 106 and/or other overloaded functions with generic type hierarchies and/or parameters that are invariant, covariant, and/or contravariant. In particular, compilation manager 102 and/or runtime system 104 may select an implementation for invocation by function call 112 based on an applicability of the implementation to function call 112 and a partial order of implementations 114-116, as discussed in further detail below with respect to FIG. 2. Compilation manager 102 and/or runtime system 104 may additionally perform type inference on generic type parameters of the selected implementation, as discussed further below with respect to FIG. 3.

Figure 2:
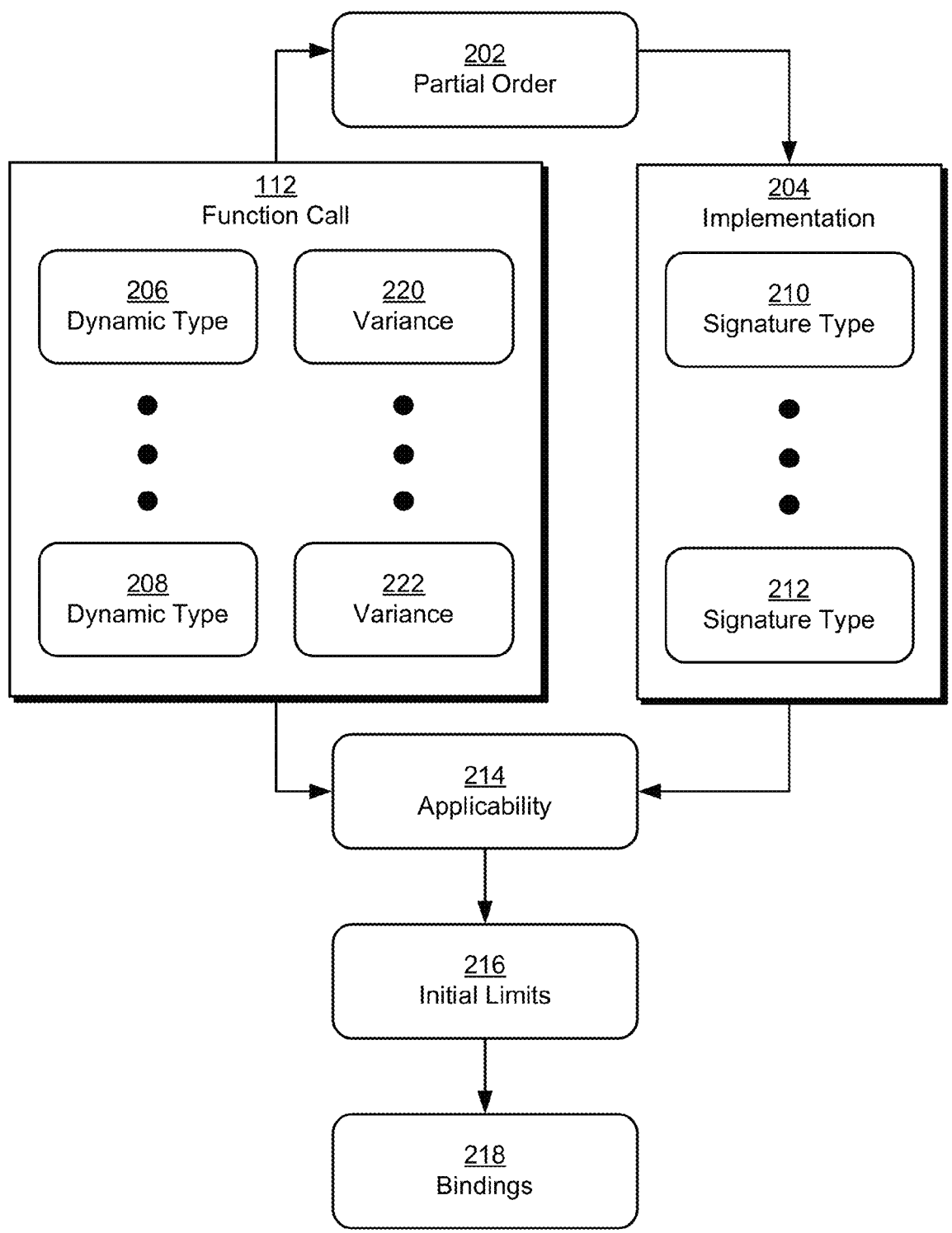
FIG. 2 shows the selection of an implementation of an overloaded function for invocation by a function call in accordance with the disclosed embodiments.

FIG. 2 shows the selection of an implementation 204 of an overloaded function (e.g., overloaded function 106 of FIG. 1) for invocation by a function call 112 in accordance with the disclosed embodiments. As mentioned above, implementation 204 may be selected based on a partial order 202 of implementations (e.g., implementations 114-116 of FIG. 1) for the overloaded function. For example, static analysis may be used to provide partial order 202 and enforce the language-level restrictions on types described above.

In addition, partial order 202 may correspond to a most-to-least specific order, so that dynamic dispatch of function call 112 may be reduced to testing a can-apply predicate for each implementation until a match is found. This reduces overload resolution to the simpler problem of determining if an implementation is applicable to the actual parameters supplied by function call 112. The same dispatch strategy may also be used whenever there is an order among an overloaded function's implementations (e.g., a user-specified preference for dispatch, using the most-recently-written applicable member, etc.).

In one or more embodiments, function call 112 is resolved using a dispatch predicate that determines an applicability 214 of implementation 204 to function call 112 based on one or more dynamic types 206-208 for arguments of function call 112 and one or more signature types 210-212 of implementation 204. For example, the dispatch predicate may return false if implementation 204 is not applicable to function call 112 and true if implementation 204 is applicable to function call 112. If implementation 204 is not applicable, the dispatch predicate is repeated for one or more subsequent implementations in partial order 202 until an applicable implementation is found. If implementation 204 is applicable, the dispatch predicate may provide bindings 218 for any static type parameters present in signature types 210-212.

Dynamic types 206-208 may be type constant expressions which lack type variables but may contain tuples, arrows, instantiated-with-constants generic types, unions, Any, trait, and object types. Signature types 210-212 may include type variables, tuples, arrows, instantiated-with-signatures generic types, and type constants. A signature type may contain a union type appearing as a type constant, but elements of the union type cannot contain type variables. All types are also expressed in their canonical form, so it is known that if A and B are both terms of a union type, then neither is a subtype of the other.

During the determination of applicability 214, each dynamic type 206-208 for an argument of function call 112 is compared to the corresponding signature type 210-212 of implementation 204 based on a variance 220-222 (e.g., covariant, invariant, contravariant) of the dynamic type. If a subtype relationship between the dynamic type and the signature type does not conform to the variance, implementation 204 is determined to be not applicable to function call 112. If the subtype relationship conforms to the variance, implementation 204 is determined to be applicable to function call 112, and a set of initial limits 216 on one or more generic type parameters of implementation 204 are determined. Dispatch predicates for overloaded functions using type intervals is described in a co-pending non-provisional application by inventors Karl Naden, Justin Hilburn, David Chase, Guy Steele, Victor Luchangco and Eric Allen, entitled "Dispatch Predicate for Overloaded Functions using Type Intervals," having Ser. No. 13/601,745, and filing date Aug. 31, 2012, which is incorporated herein by reference.

For example, the dispatch predicate for determining applicability 214 may be implemented using a "match" function that takes three parameters: the first ("T") is a signature type (e.g., signature types 210-212) that may contain unbound static (e.g., generic) type parameters, the second ("V") is the variance (encoded as +1, 0, and −1, where positive is covariant, 0 is invariant, and negative is contravariant), and the third ("A") is an actual dynamic type (e.g., dynamic types 206-208) to be related to the signature type, subject to the specified variance. The "match" function may also rely on the set "S" of type names being inferred, and for each type name "t S" augments upper and lower bound constraint sets "Ut" and "Lt" (e.g., initial limits 216).

If the type and signature cannot be related, then "match" fails. If the dynamic type and signature type can be related, "match" returns normally and adds necessary constraints to the upper and lower bound sets (e.g., initial limits 216), which are the input to type inference of the generic type parameters. Initial limits 216 may then be used to determine bindings 218 during type inference of generic type parameters, as discussed in further detail below with respect to FIG. 3.

Figure 3:
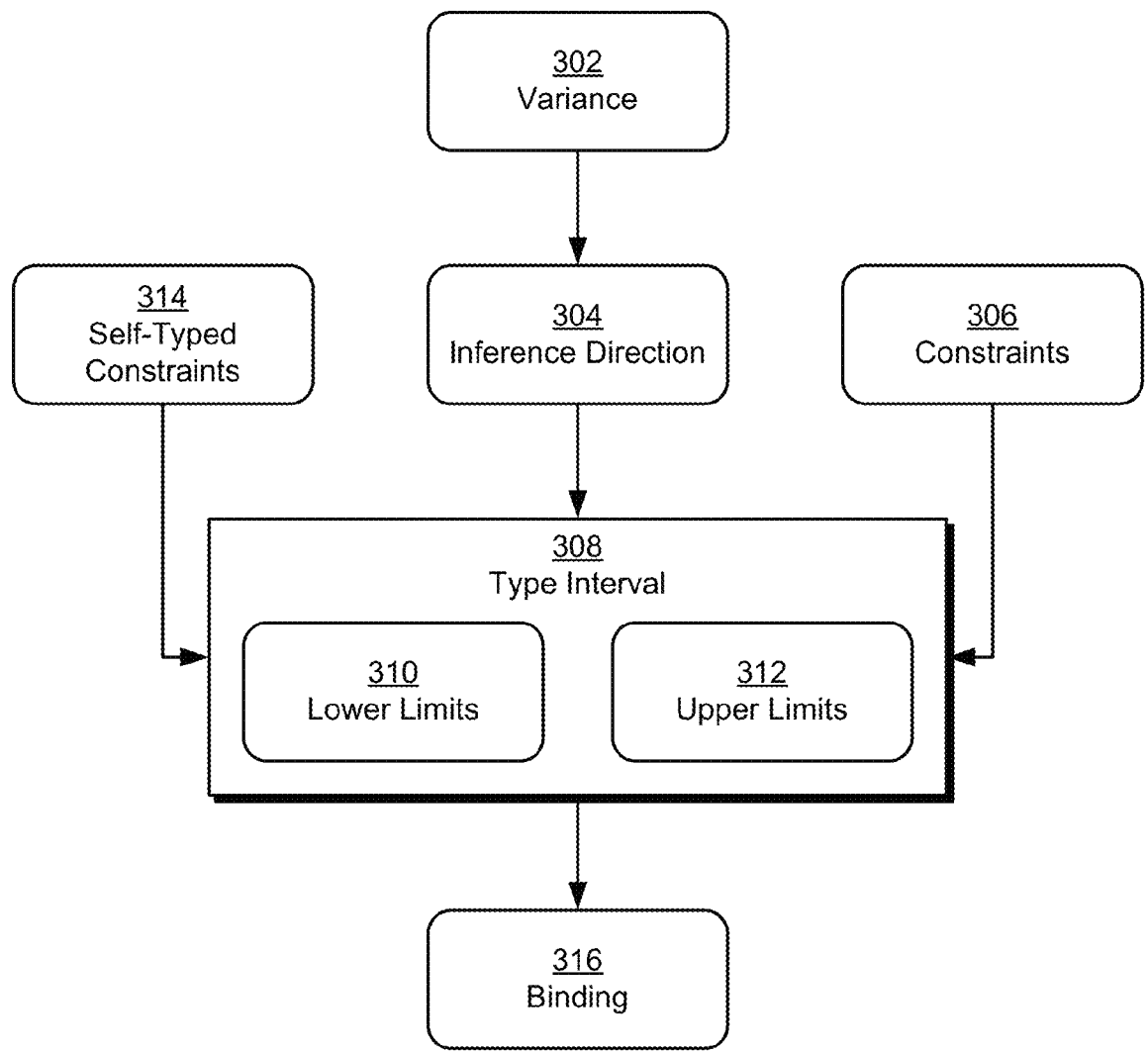
FIG. 3 shows type inference on generic type parameters of an implementation of an overloaded function in accordance with the disclosed embodiments.

FIG. 3 shows type inference on generic type parameters of an implementation of an overloaded function (e.g., overloaded function 106 of FIG. 1) in accordance with the disclosed embodiments. As described in the above-referenced application, type inference may be performed after the implementation is initially determined to be applicable to a function call associated with the overloaded function (e.g., using the "match" function).

During type inference, a binding 316 for a generic type parameter of the implementation may be selected based on a type interval 308 and an inference direction 304 for the generic type parameter. Type interval 308 may include one or more lower limits 310 and/or one or more upper limits 312, which may be obtained from the "match" function described in the above-referenced application. For example, upper limits 312 and/or lower limits 310 in type interval 308 may be initialized using the following:

```
Let Pi = the statically declared types of the function's input parameters,
    1 <= i <= n.
Let Tr = the declared return type of the function.
Let Di = the actual data passed to the function (which has attached runtime
    type information stored in a field "RTTI").
Encode variance as +1/0/-1, where +1 is covariance, 0 is invariance,
    and -1 is contravariance.
To obtain the set of parameter occurrences:
    for 1 <= i <= n do match (Pi, +1, Di.RTTI) end
If a return type upper limit R is provided by static analysis:
    match(Tr, +1, R)
```

Prior to determining inference direction 304, two maps "Md" and "Mr" may be constructed by a similar recursive walk, but applied to the domain and return type in the signature of the implementation:

```
Let Mr, Md = initially empty multimaps from type parameter names to
    variances.
Encode variance as +1/0/-1, where +1 is covariance, 0 is invariance,
    and -1 is contravariance.
Let S = the set of names of type parameters for the generic function.
Let gather(T :Type, V :Variance, M :Multimap) = do // T is signature type
    if T is a type constant then do nothing
    else if T is a type name in S, then add T -> V to M.
    else if T is an Arrow Tdomain -> Trange then
        gather(Tdomain, -V, M)
        gather(Trange, V, M)
    else if T is a Tuple (T1, ..., Tm) then
        for 1 <= j <= m do gather(Tj, V, M) end
    else if T is a generic type expression containing at least one name in
    S
        let G = the generic stem of T.
        let (T1, ..., Tm) = the declared type parameters of T.
        let (V1, ..., Vm) = the variance of each declared type parameter of T
        for 1 <= j <= m do gather(Tj, V * Vj, M) end
end // gather
for 1 <= i <= n do gather (Pi, +1, Md) end
gather(Tr, +1, Mr)
```

Md may correspond to a variance map computed from the declared domain type of the implementation, and Mr may correspond to a variance map computed from the declared return type of the implementation. The "match" and "gather" recursive walks may also be combined into a single procedure.

Next, inference direction 304 may be selected according to the computed variance maps. Inference direction 304 may be an upward inference direction, in which binding 316 is selected from one or more upper limits 312 in type interval, or a downward inference direction, in which binding 316 is selected from one or more lower limits 310 in type interval 308. More specifically, inference goals for the generic type parameter may be intended to guide generated data away from general cases that are expected to be less efficient, which usually means toward the most-subtyped (lowest) inferred types. Arrow-typed parameters and return values, however, are contravariant in their domain, which means that a domain type should be inferred toward its higher limit. Furthermore, the type chosen for the return type will influence the creation of data intended for future use, so it is more important to specialize that than the parameters.

In one or more embodiments, inference direction 304 is selected based on a variance 302 of the generic type parameter. Continuing with the above example, inference direction 304 may be selected using an "up-down" heuristic that first considers all type parameters that occur in "Mr" (the variance map computed from the declared return type). Those that have any "invariant" or "covariant" occurrences are assigned a downward inference direction 304. All other type parameters that occur in "Mr" must only have contravariant occurrences, and they are assigned an upward inference direction. Next, all type parameters not assigned in the previous step that appear in "Md" (the variance map computed from the declared domain type) and have any covariant or invariant occurrences are assigned a downward inference direction 304. The remaining unassigned type parameters that appear in Md are assigned an upward inference direction 304. Any type parameters that appear nowhere in the function declaration may then be assigned the downward inference direction 304.

Those skilled in the art will appreciate that other heuristics may be used to assign inference directions (e.g., inference direction 304) to generic type parameters. For example, an inference direction for a generic type parameter may be selected based on an annotation associated with the generic type parameter, which may be provided by a programmer at the function declaration of the implementation and/or the function call.

Type inference may then be performed on the generic type parameter by propagating one or more limits associated with type interval 308 (e.g., lower limits 310, upper limits 312) through a set of constraints 306 associated with the generic type parameter based on inference direction 304. Such propagation may be based on two type parameter orders of generic type parameters associated with the implementation, which depend on the inference directions (e.g., inference direction 304) for the generic type parameters and constraints 306. The first order applies to all type variables and updates both upper limits (e.g., upper limits 312) and lower limits (e.g., lower limits 310); the second "deferred inference" order applies to those type variables with an upward inference direction, and updates only upper limits.

If the inference direction for a generic type parameter "Ti" is the downward inference direction, then any type variables on the right-hand side of any constraint "Ti<:typeExpr" depend on "Ti." If the inference direction for "Ti" is the upward inference direction, then "Ti" deferred-depends on all type variables on the right-hand-side of any constraint "Ti<: typeExpr." Ordinary dependence for some generic type parameters associated with the upward inference direction is determined by the structure of the type constraint and inference goals of type parameters mentioned on the right-hand-side:

Ti<:Tk, Tk lower. Tk depends on Ti.
Ti<:G[ ..., Tk, ... ], G covariant at Tk, Tk lower. Tk depends on Ti.
Ti<:G[ ..., Tk, ... ], G contravariant at Tk, Tk upper. Tk depends on Ti.
Ti<:G[ ..., Tk, ... ], G invariant at Tk, Tk either. Tk depends on Ti.

In all of these cases, the desired goals for generic type parameters "Tk" and "Ti" are (potentially) in direct conflict. The downward inference direction for the right-hand-side is given priority, but it cannot be lower than the lower limit on "Ti." Other combinations of right-hand-side parameter variance and inference direction do not generate any ordinary dependence.

In addition, each order is acyclic, because the underlying constraints 306 are acyclic. The first order runs from most-to-least-constrained, the deferred order runs from least-to-most-constrained, and the constraint order is itself acyclic.

During propagation of limits associated with type interval 308, a first propagation of the limits may be performed to update one or more upper limits 312 in type interval 308 and one or more lower limits in type intervals of one or more generic type parameters related to the generic type parameter.

Next, a second propagation of the one or more limits may be performed to further update upper limits 312 if inference direction 304 is the upward inference direction. If the generic type parameter includes one or more self-typed constraints 314, a lower limit (e.g., lower limits 310) of type interval 308 may be adjusted upward to a lowest self-type that simultaneously satisfies self-typed constraints 314 and remains below the upper limits 312 during the first propagation. If inference direction 304 is the upward inference direction, upper limits 312 may be adjusted downward to a highest self-type that simultaneously satisfies self-typed constraints 314 and remains above the lower limit.

After limits are propagated, binding 316 may be chosen based on type interval 308 and inference direction 304. If type interval 308 is non-empty, binding 316 may be selected as the meet of all limits associated with the upward inference direction and/or as the join of all limits associated with the downward inference direction. If type interval 308 is empty, the implementation may be determined to be not applicable to the function call.

For example, the first propagation of limits may be performed using the following steps:

For each type parameter Ti in the first order, if the set of lower limits Li is non-empty (not bottom), then:
If there are self-typed constraints, adjust lower limit upwards to satisfy self-typed constraints.
For each non-self-typed constraint where Ti appears on the left-hand-side, choose from the following cases as appropriate:
if Ti<:TC, add constant TC to Ui
if Ti<:Tk, add Li to Lk
Ti<:G[ . . . , Tk, . . . ] with some variance. If Li is empty, do nothing and succeed. Otherwise, for each A in Li, walk(G[ . . . ], +1, A).
If Ti is associated with the downward inference direction, verify that every L in Li (e.g., the lower limits for the type interval of Ti) is a subtype of every U in Ui (e.g., the upper limits for the type interval of Ti). If true, the join of the lower limits is used as the binding for the type parameter. If false, dispatch fails.

The second propagation of limits may then be performed using the following steps:

For each Ti in the deferred inference order,
for each non-self constraint where Ti appears on the right-hand-side,
if Ti<:Tk, insert Tk into Ui.
if Ti<:G[ . . . , T2, T3, T4, . . . ], insert G[ . . . , T2, T3, T4, . . . ] into Ui. That is, T2-T4 are now bound, instantiate G with those bindings, and insert the result into Ui.
After all non-self constraints for Ti have been processed, if there are self-typed constraints, then Ui must be lowered to the highest self-type satisfying all self-type constraints. For non-bottom Li, the highest self-type can be found by searching upwards; if Li is bottom, then any self-type choice below Ui is type-correct.
After self-type adjustment, if every member of "Li" subtypes every member of "Ui," the meet of the upper limits is used as the binding for the type parameter. Otherwise, dispatch fails.

Type inference of generic type parameters using the techniques described above may be illustrated with the following example. Suppose that Equality[T] is a covariant self-type that provides the ability to test equality:

```
trait Equality[covariant T] comprises T
    eq(other:T)
end
```

In addition, "f" is an overloaded function:

```
f(x:Any) :Any = x
f[T <: Equality[T]] (g:T -> Integer, d:T) : (T,T) ->Integer =
    fn(x:T,y:T) => if x.eq(y) then g(d) else g(x) + g(y)
end
```

One very general implementation of "f" takes "x" with type Any (in other words, all possible inputs) and returns it. The second implementation applies when the input happens to be a 2-element tuple of function and default input, generic in T, where T must be a self-type with Equality, and that returns a function from tuples of (T,T) to integers. A body is provided to show that code implementing this contrived type signature is, in fact, possible. The second implementation is clearly more specific, and the pair of functions clearly obeys both the meet rule and return type rule; this is a legal overload using the Fortress rules.

Now consider the following declarations:

```
trait Q
    foo( ) :Integer
end
h (q:Q) :Integer = q.foo ( )
trait R extends { Equality[R], Q } . . . end
trait S extends { Equality[S], R } . . . end
object O extends R . . . end
object P extends S . . . end
```

"h" is a function mapping Q to Integer. "Q→Integer" extends "R→Integer," and "R→Integer" extends "S→Integer." That is, "S→Integer" is the most general type because arrow types are contravariant in their domain.

Consider invocation of f(h, O) and f(h, P). Both invocations can dispatch to the non-general implementation:

f[T<:Equality[T]](g:T→Integer, d:T): (T,T)→Integer

What binding for "T" should be inferred for the two invocations?

In the case of "f(h, O)," "T" is bounded below by "O" and above by "Q," with "R<:Equality[R]" between them. The answer here is clearly "R," and the return type is "(R,R)→Integer."

In the case of "f(h, P)," "T" is bounded below by "P" and above by "Q," with both "S" and "R" between satisfying the self-type constraint "T<:Equality[T]," where "P<:S<:R<:Q." Which is better? There are two reasons to prefer "R." First, the resulting arrow type is more specific if "R" is chosen, and dispatch usually works best when more-specific types are returned. Second, the resulting arrow type will be applicable to more inputs if "R" is chosen.

This motivates both the two-clause structure and the first clause of the "up-down" heuristic. If the only appearance of a type parameter in the return type of an implementation is in the contravariant position, then the inference direction for the type parameter shall be the upward inference direction (more general). Notice how this example picks the upward inference direction for "T" even though "T" appears in both covariant and contravariant contexts in the domain of f; the domain is considered in the second clause, which only matters for type parameters not determined in the return type.

When the downward inference direction is selected, the self-type adjustment requires an upward search from the lower limit where the search stops at the first choice satisfying constraints. For the upward inference direction, the search for a self-type-satisfying choice begins at the lower limit, because typical runtime type information data structures make it easier to search up than to search down. However, the search continues until it fails or exceeds the upper bound (in this case, Q). The last satisfactory solution before failure is the one that is chosen (in this case, R).

Figure 4:
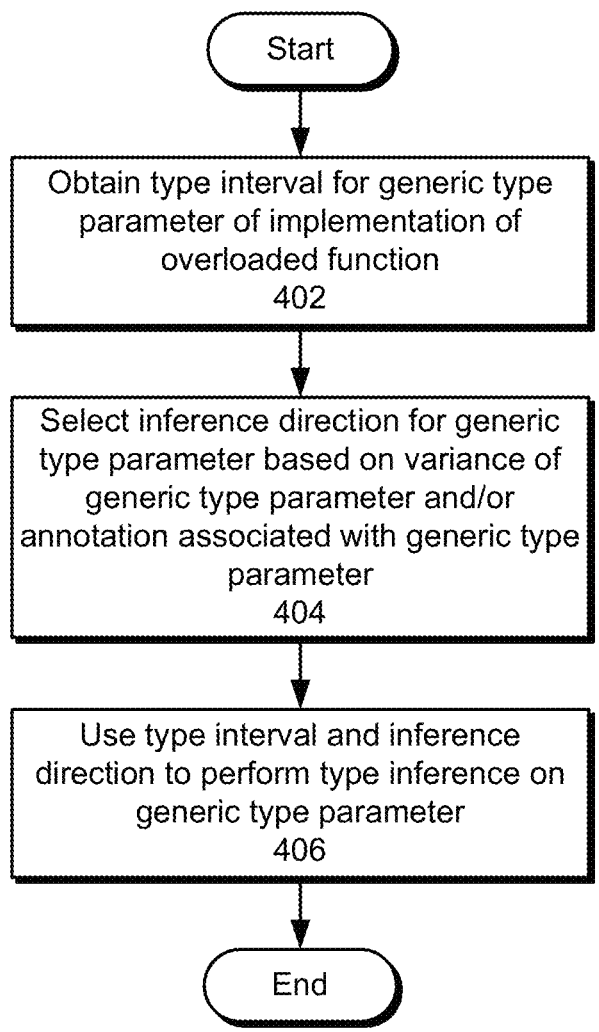
FIG. 4 shows a flowchart illustrating the process of facilitating the development and execution of a software program in accordance with the disclosed embodiments.

FIG. 4 shows a flowchart illustrating the process of facilitating the development and execution of a software program in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a type interval for a generic type parameter of an implementation of an overloaded function is obtained (operation 402). The type interval may include one or more lower limits and/or one or more upper limits for the generic type parameter. Next, an inference direction is selected for the generic type parameter based on a variance of the generic type parameter and/or an annotation associated with the generic type parameter (operation 404). For example, a downward inference direction may be selected for the generic type parameter if the variance is covariant or invariant, and an upward inference direction may be selected for the generic type parameter if the variance is contravariant. Alternatively, the inference direction may be specified by a programmer annotation at the function declaration of the implementation and/or a function call to the overloaded function to which the implementation is applicable.

Finally, the type interval and inference direction are used to perform type inference on the generic type parameter (operation 406). Type inference on generic type parameters of implementations of overloaded functions is discussed in further detail below with respect to FIG. 5.

Figure 5:
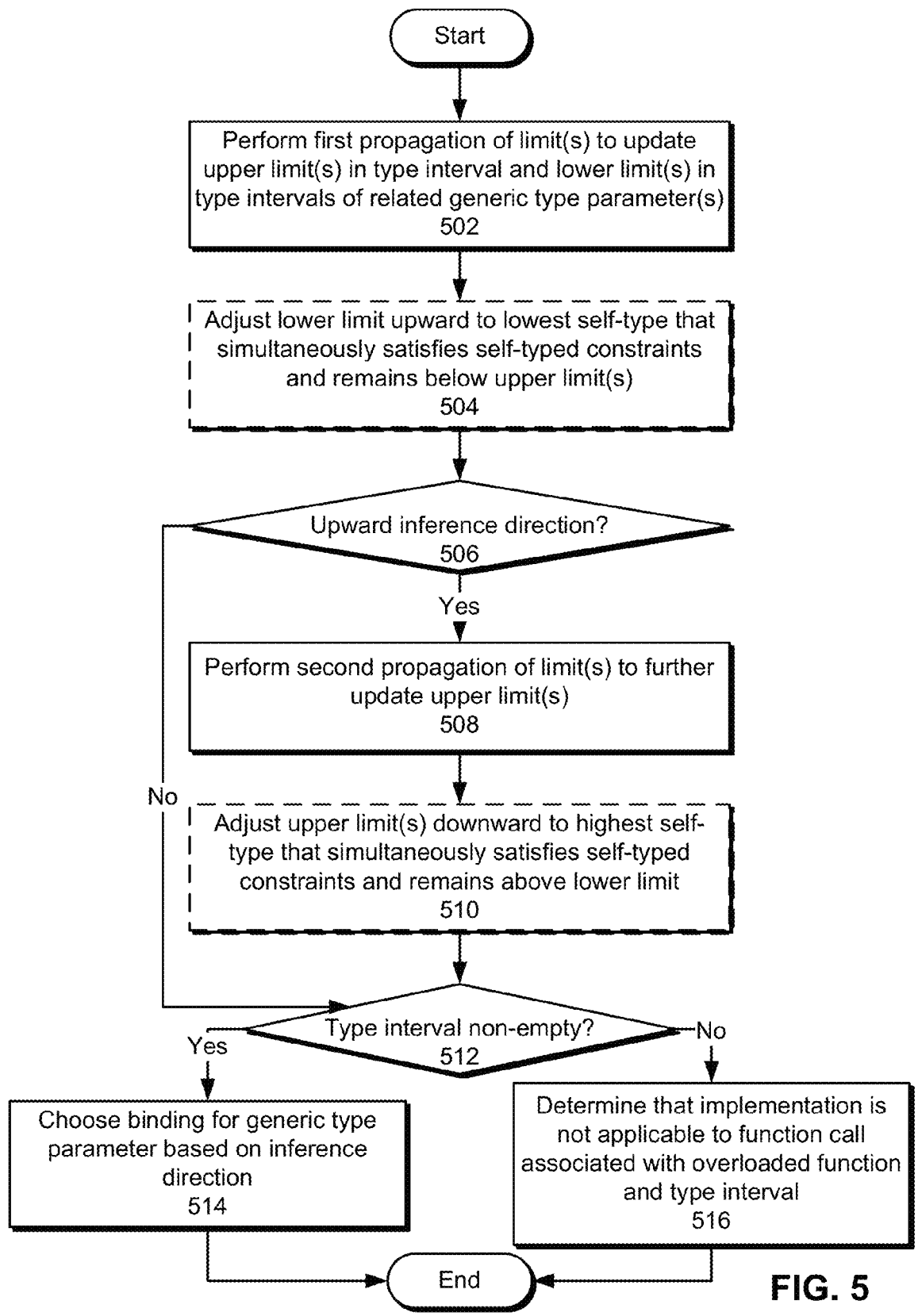
FIG. 5 shows a flowchart illustrating the process of performing type inference on a generic type parameter of an implementation of an overloaded function in accordance with the disclosed embodiments.

FIG. 5 shows a flowchart illustrating the process of performing type inference on a generic type parameter of an implementation of an overloaded function in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

During type inference of the generic type parameter, one or more limits associated with a type interval for the generic type parameter may be propagated through a set of constraints associated with the generic type parameter based on an inference direction for the generic type parameter. In particular, a first propagation of the one or more limits may be performed to update one or more upper limits in the type interval and one or more lower limits in type intervals of generic type parameters related to the generic type parameter (operation 502). The first propagation may be performed regardless of the generic type parameter's inference direction. Moreover, if the generic type parameter is associated with one or more self-typed constraints, a lower limit of the type interval may be adjusted upward to a lowest self-type that simultaneously satisfies the self-type constraints and remains below the upper limit(s) (operation 504).

An upward inference direction may be assigned to the generic type parameter (operation 506). If the generic type parameter is not associated with the upward inference direction (e.g., if a downward inference direction is selected for the generic type parameter), no further adjustments to the type interval are made. If the upward inference direction is assigned to the generic type parameter, a second propagation of limit(s) is performed to further update the upper limit(s) of the type interval (operation 508). If the generic type parameter is associated with one or more self-typed constraints, the upper limit(s) may be adjusted downward to a highest self-type that simultaneously satisfies the self-typed constraints and remains above the lower limit (operation 510).

The type interval may be non-empty (operation 512) after the limits are propagated. For example, the type interval may be non-empty if the lower limit of the type interval is below (e.g., subtypes) the upper limit of the type interval. If the type interval is non-empty, a binding for the generic type parameter is chosen based on the inference direction (operation 514). For example, the binding may be chosen as the meet of all limits associated with the upward inference direction in the type interval (e.g., the upper limits), or as the join of all limits associated with the downward inference direction in the type interval (e.g., the lower limits). If the type interval is empty, the implementation is determined to not be applicable to a function call associated with the overloaded function and type interval (operation 516), and no binding for the generic type parameter is chosen.

Figure 6:
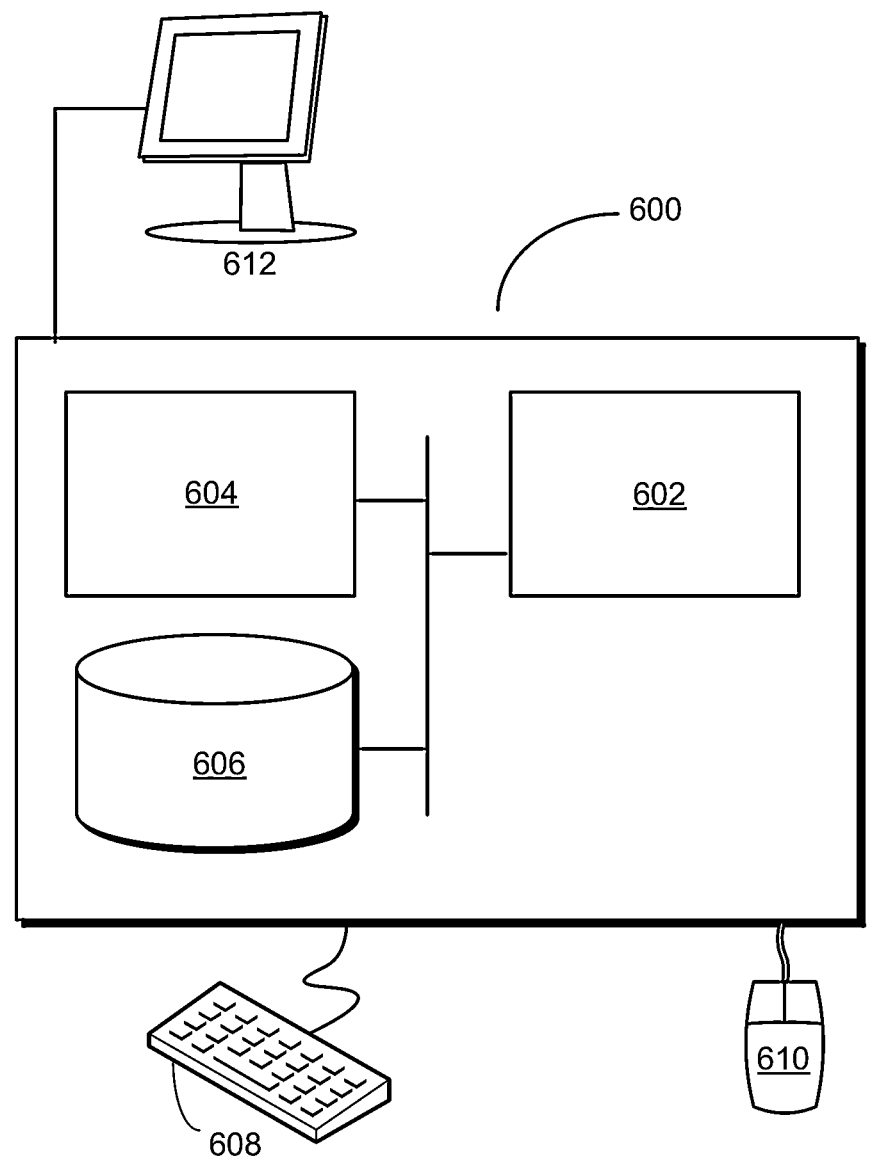
FIG. 6 shows a computer system in accordance with the disclosed embodiments.

FIG. 6 shows a computer system 600 in accordance with the disclosed embodiments. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In particular, computer system 600 may provide a system for facilitating the development and execution of a software program. The system may include a compilation manager and a runtime system. The compilation manager and/or runtime system may obtain a type interval for a generic type parameter of an implementation of an overloaded function. Next, the compilation manager and/or runtime system may select an inference direction for the generic type parameter based on a variance of the generic type parameter. Finally, the compilation manager and/or runtime system may use the type interval and the inference direction to perform type inference on the generic type parameter.

In addition, one or more components of computer system 600 may be remotely located and connected to the other components over a network. Portions of the present embodiments (e.g., compilation manager, runtime system, etc.) may also be located on different nodes of a distributed system that implements the embodiments. For example, the present embodiments may be implemented using a cloud computing system that remotely manages the development, compilation, and execution of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the development and execution of a software program, comprising:
    obtaining a type interval for a generic type parameter of an implementation of an overloaded function;
    selecting an inference direction for the generic type parameter based on a variance of the generic type parameter, wherein the inference direction is an upward inference direction or a downward inference direction; and
    using the type interval and the inference direction to perform type inference on the generic type parameter, wherein doing so comprises:
        propagating one or more limits associated with the type interval through a set of constraints associated with the generic type parameter based on the inference direction;
        when the type interval is non-empty after the one or more limits are propagated through the set of constraints, choosing a binding for the generic type parameter based on the inference direction; and
    when the type interval is empty after the one or more limits are propagated through the set of constraints, determining that the implementation is not applicable to a function call associated with the overloaded function and the type interval.

2. The computer-implemented method of claim 1, further comprising:
    selecting the inference direction based on an annotation associated with the generic type parameter.

3. The computer-implemented method of claim 1, wherein propagating the one or more limits through the set of constraints based on the inference direction involves:
    performing a first propagation of the one or more limits to update one or more upper limits in the type interval and one or more lower limits in type intervals of one or more generic type parameters related to the generic type parameter; and
    when the inference direction is the upward inference direction, performing a second propagation of the one or more limits to further update the one or more upper limits.

4. The computer-implemented method of claim 3, wherein propagating the one or more limits through the set of constraints based on the inference direction further involves:
    when the generic type parameter comprises one or more self-typed constraints, adjusting a lower limit of the type interval upward to a lowest self-type that simultaneously satisfies the one or more self-typed constraints and remains below the one or more upper limits; and
    when the inference direction is the upward inference direction, adjusting the one or more upper limits downward to a highest self-type that simultaneously satisfies the one or more self-typed constraints and remains above the lower limit.

5. The computer-implemented method of claim 1, wherein choosing the binding for the generic type parameter based on the inference direction involves at least one of:
    selecting the binding as the meet of all limits associated with the upward inference direction in the type interval; and
    selecting the binding as the join of all limits associated with the downward inference direction in the type interval.

6. The computer-implemented method of claim 1, wherein selecting the inference direction based on the variance of the generic type parameter involves:
    when the variance is covariant or invariant, selecting the downward inference direction for the generic type parameter; and
    when the variance is contravariant, selecting the upward inference direction for the generic type parameter.

7. A system for facilitating the development and execution of a software program, comprising:
    a compilation manager for the software program; and
    a runtime system for the software program,
    wherein the compilation manager and the runtime system are configured to:
        obtain a type interval for a generic type parameter of an implementation of an overloaded function;
        select an inference direction for the generic type parameter based on a variance of the generic type parameter, wherein the inference direction is an upward inference direction or a downward inference direction; and
        use the type interval and the inference direction to perform type inference on the generic type parameter, wherein doing so comprises:
            propagating one or more limits associated with the type interval through a set of constraints associated with the generic type parameter based on the inference direction;
            when the type interval is non-empty after the one or more limits are propagated through the set of constraints, choosing a binding for the generic type parameter based on the inference direction; and
            when the type interval is empty after the one or more limits are propagated through the set of constraints, determining that the implementation is not applicable to a function call associated with the overloaded function and the type interval.

8. The system of claim 7, wherein propagating the one or more limits through the set of constraints based on the inference direction involves:
    performing a first propagation of the one or more limits to update one or more upper limits in the type interval and one or more lower limits in type intervals of one or more generic type parameters related to the generic type parameter; and
    when the inference direction is the upward inference direction, performing a second propagation of the one or more limits to further update the one or more upper limits.

9. The system of claim 8, wherein propagating the one or more limits through the set of constraints based on the inference direction further involves:
    when the generic type parameter comprises one or more self-typed constraints, adjusting a lower limit of the type interval upward to a lowest self-type that simultaneously satisfies the one or more self-typed constraints and remains below the one or more upper limits; and
    when the inference direction is the upward inference direction, adjusting the one or more upper limits downward to a highest self-type that simultaneously satisfies the one or more self-typed constraints and remains above the lower limit.

10. The system of claim 7, wherein selecting the inference direction based on the variance of the generic type parameter involves:
    when the variance is covariant or invariant, selecting the downward inference direction for the generic type parameter; and when the variance is contravariant, selecting the upward inference direction for the generic type parameter.

11. A non-transitory computer-readable storage medium storing instructions that when executed by a computer cause the computer to perform a method for facilitating the development and execution of a software program, the method comprising:
- obtaining a type interval for a generic type parameter of an implementation of an overloaded function;
- selecting an inference direction for the generic type parameter based on a variance of the generic type parameter, wherein the inference direction is an upward inference direction or a downward inference direction; and
- using the type interval and the inference direction to perform type inference on the generic type parameter, wherein doing so comprises:
  - propagating one or more limits associated with the type interval through a set of constraints associated with the generic type parameter based on the inference direction;
  - when the type interval is non-empty after the one or more limits are propagated through the set of constraints, choosing a binding for the generic type parameter based on the inference direction; and
  - when the type interval is empty after the one or more limits are propagated through the set of constraints, determining that the implementation is not applicable to a function call associated with the overloaded function and the type interval.

12. The non-transitory computer-readable storage medium of claim 1, wherein propagating the one or more limits through the set of constraints based on the inference direction involves:
- performing a first propagation of the one or more limits to update one or more upper limits in the type interval and one or more lower limits in type intervals of one or more generic type parameters related to the generic type parameter; and
- when the inference direction is the upward inference direction, performing a second propagation of the one or more limits to further update the one or more upper limits.

13. The non-transitory computer-readable storage medium of claim 12, wherein propagating the one or more limits through the set of constraints based on the inference direction further involves:
- when the generic type parameter comprises one or more self-typed constraints, adjusting a lower limit of the type interval upward to a lowest self-type that simultaneously satisfies the one or more self-typed constraints and remains below the one or more upper limits; and
- when the inference direction is the upward inference direction, adjusting the one or more upper limits downward to a highest self-type that simultaneously satisfies the one or more self-typed constraints and remains above the lower limit.

14. The non-transitory computer-readable storage medium of claim 11, wherein selecting the inference direction based on the variance of the generic type parameter involves:
- when the variance is covariant or invariant, selecting the downward inference direction for the generic type parameter; and
- when the variance is contravariant, selecting the upward inference direction for the generic type parameter.

* * * * *

UNITED STATES PATENT AND TRADEMARK OFFICE
CERTIFICATE OF CORRECTION

PATENT NO. : 8,893,082 B2
APPLICATION NO. : 13/601766
DATED : November 18, 2014
INVENTOR(S) : Naden et al.

It is certified that error appears in the above-identified patent and that said Letters Patent is hereby corrected as shown below:

IN THE SPECIFICATION:

In column 7, line 48, delete "T→( )," and insert -- T - > ( ), --, therefor.

In column 7, line 48, delete "T→( )" and insert -- T - > ( ) --, therefor.

In column 7, line 49, delete "X→( )" and insert -- X - > ( ) --, therefor.

In column 7, line 50, delete "Y→( )" and insert -- Y - > ( ) --, therefor.

In column 14, line 36, delete ""Q→Integer"" and insert -- "Q->Integer" --, therefor.

In column 14, line 37, delete ""R→Integer,"" and insert -- "R->Integer," --, therefor.

In column 14, line 37, delete ""R→Integer"" and insert -- "R->Integer" --, therefor.

In column 14, line 37, delete ""S→Integer."" and insert -- "S->Integer." --, therefor.

In column 14, line 38, delete ""S→Integer"" and insert -- "S-> Integer" --, therefor.

In column 14, line 42, delete ":T→" and insert -- T - > --, therefor.

In column 14, line 42, delete "(T,T)→" and insert -- (T,T) - > --, therefor.

In column 14, line 49, delete ""(R,R)→" and insert -- "(R,R)-> --, therefor.

IN THE CLAIMS:

In column 19, line 31, in Claim 12, delete "claim 1," and insert -- claim 15, --, therefor.

Signed and Sealed this
Twenty-third Day of June, 2015

Michelle K. Lee
*Director of the United States Patent and Trademark Office*